Feb. 22, 1966     N. LAING     3,236,298
HEAT EXCHANGERS
Filed April 19, 1963
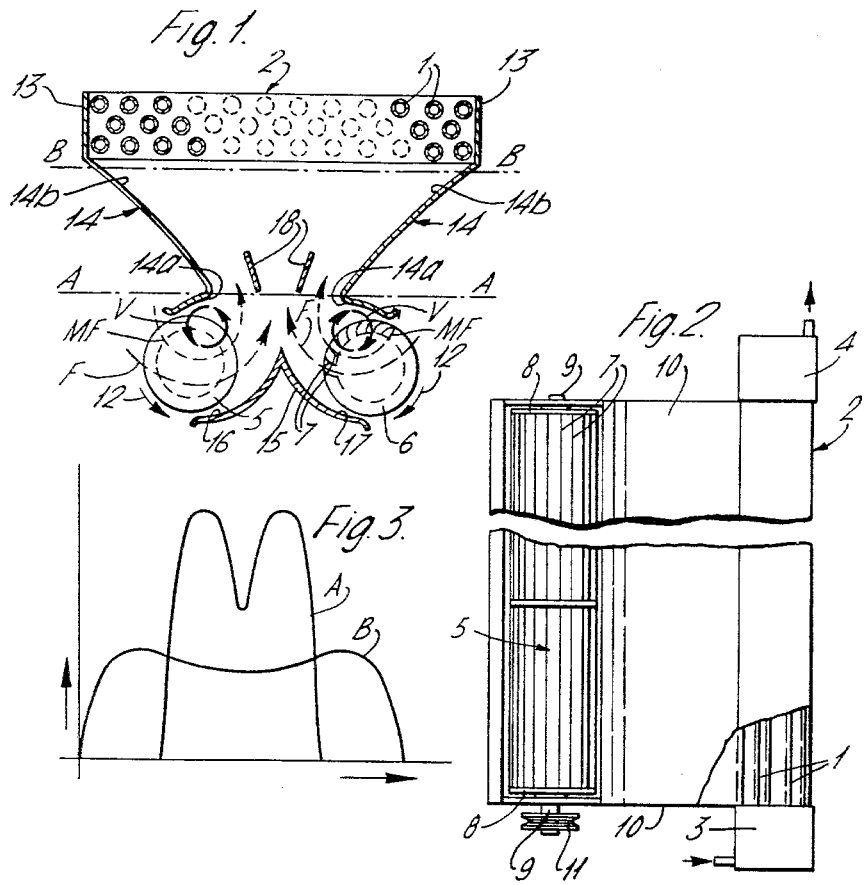
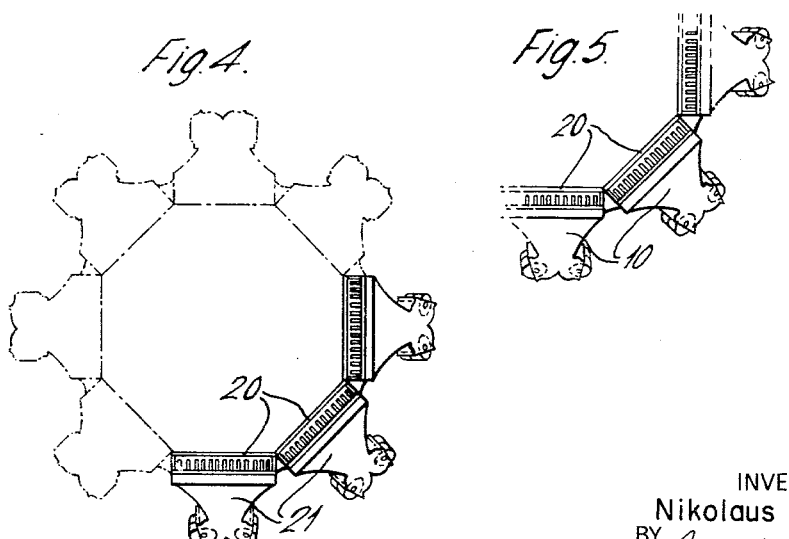
INVENTOR
Nikolaus Laing
BY
ATTORNEYS

United States Patent Office 3,236,298
Patented Feb. 22, 1966

3,236,298
HEAT EXCHANGERS
Nikolaus Laing, Aldingen, near Stuttgart, Germany, assignor, by mesne assignments, to Laing Vortex, Inc., New York, N.Y.
Filed Apr. 19, 1963, Ser. No. 274,360
Claims priority, application Great Britain, Apr. 19, 1962, 15,401/62
3 Claims. (Cl. 165—124)

This invention relates to heat exchange units and to assemblies made up of a number of such units.

In a variety of different plants it is necessary to provide for an exchange of heat between a fluid flowing in some arrangement of conduits and the ambient air; the conduits may be disposed in a block which is generally rectangular as seen in plan and which is mounted horizontally, and means may be provided to blow the air upwardly through the thickness of the block to induce a more rapid heat transfer than would take place with the aid of natural convection alone.

In heat exchanger units of the kind described the blower means has in the past been provided by a large axial fan revolving slowly in a plane parallel to and below the heat exchanger block. This arrangement cannot however produce an even supply of air over the area of the block as required for optimum conditions of heat exchange, and the slow speed of the fan involves expensive motors, or geared drives which are also expensive.

A main object of the invention is to provide an improved form of heat exchanger unit wherein the blower means are capable of producing a more even air supply than the arrangement just described, and which can have a much higher rotational speed.

The invention accordingly provides a heat exchanger unit comprising a series of conduits arranged in the form of a rectangular block and blower means to blow air through the thickness of the block, said blower means comprising a pair of similar bladed cylindrical rotors mounted parallel to each other and to one side of the block and being approximately equal in length to that side, drive means to rotate the rotors at equal speed in opposite directions, and guide means which in operation guides air twice through the blades of each rotor transversely to the axis thereof and subsequently through the block, said guide means including a pair of opposed walls each leading from adjacent one rotor to the corresponding side of the block said walls providing a common diffuser receiving the air from both rotors leading it to the block.

Further features and advantages of the invention will become apparent from the following description of certain embodiments thereof given by way of example with reference to the accompanying drawings, in which:

FIGURE 1 is a transverse section of a heat exchanger unit according to the invention;

FIGURE 2 is a side elevation of the FIGURE 1 unit with a part removed;

FIGURE 3 shows a pair of curves illustrating the functioning of the unit of FIGURES 1 and 2;

FIGURE 4 is a plan view of a cooling tower made up from units as shown in FIGURES 1 and 2, and FIGURE 5 is an enlarged plan view of the FIGURE 4 tower showing drive arrangements omitted from FIGURE 4.

Referring to the drawings, the heat exchanger unit of FIGURES 1 and 2 comprises a series of conduits 1 arranged in the form of a rectangular block designated generally 2 and running in parallel spaced relation between a pair of headers 3, 4 at opposite shorter sides of the block. Fluid to be cooled is supplied to one header 3 and flows through the conduits to the header 4.

Means are provided to blow air through the thickness of the block 2; these means include a pair of similar rotors 5, 6 each having blades 7 arranged in a ring extending parallel to the axis between end discs 8 carrying stub shafts 9 whereby the rotors are mounted for rotation in bearings (not shown) in plane parallel end walls 10 of the unit. One stub shaft 9 of each rotor carries a pulley 11: a belt not shown driven by an electric motor or other drive means (not shown) is trained over the pulleys so as to rotate them in opposite directions as shown by the arrows 12. The rotors 5, 6 have their axes parallel to the longer sides of the block 2 and their length is equal to that of the block.

The longer sides of the block 2 are enclosed by parallel walls 13 which are continuous with similar opposed guide walls 14 extending up to those sides from adjacent the corresponding rotor 5, 6 and joining the end walls 10. Each guide wall 14 is return-bent adjacent the rotor to provide a smaller vortex-stabilizing portion 14a convergent with the rotor in the direction of rotor rotation and a largre diffuser wall portion 14b. A symmetrical central guide wall 15 also extending between the end walls 10 provides two curved portions 16, 17 facing the rotors 5, 6, diverging steadily therefrom, and meeting at a sharp angle.

In operation of the unit the blades 7 of each rotor 5, 6 (which will be seen to be concave facing in the direction of rotation with their outer edges leading) co-operate with the vortex-stabilizing guide wall portion 14a to set up a cylindrical vortex which is eccentric to the rotor axis, the core of this vortex being indicated at V. Air is consequently guided twice through the blades 7 of each rotor 5, 6 as indicated by the flow lines MF, F: the vortex causes the flow lines to curve in arcs centred approximately on the core centre and also causes flow in the line MF, which passes adjacent the core, to be much faster than the flow at the other side of the rotor. For a fuller exposition of the way in which flow takes place reference should be made to British patent specification No. 876,611. Reference should also be made to British patent specification No. 876,613 as showing a flow machine with a pair of contra-rotating rotors; this machine differs in various respects from that here shown, however.

Air which has passed the rotors 5, 6, enters symmetrically into the diffuser formed by the diffuser portions 14b of the guide walls 14 and passes through the thickness of the block 2. Small vanes 18 supported between the end walls 10 may be provided to assist the flow.

Now from the foregoing it will be seen that the velocity profile at the section A—A of FIGURE 1 (that is, as the flows from the two rotors 5, 6 join just after leaving those rotors) will be shaped somewhat as the curve A in FIGURE 3. Thus the fastest flow through the diffuser will be adjacent the wall portions 14b. This will tend to reduce break-away losses, but the speed of the air adjacent the wall will nevertheless be reduced by friction while the speed remote therefrom is less reduced. As a result, at the section B—B of FIGURE 1 (that is, just before reaching the block) the velocity profile will approximate to the curve B of FIGURE 3. The speed of the air entering the block 2 will thus be approximately uniform over the whole area of the block, which enables optimum cooling. Due to the diffuser effect the pressure at the section B—B is higher than would be possible in the arrangement hitherto known and described above, so that by reason of the present invention the block can be thicker and/or more closely packed with conduits than would formerly have been desirable, thus leading to improved economy of space and material.

A further advantage of the invention lies in the fact that the rotors 5, 6 need not be of great diameter and can with advantage be driven at speeds of the order of 1,500 r.p.m. so as to use electric motors which are relatively small and cheap. Any convenient drive arrangement can be used, and instead of driving the rotors from a single motor a pair of similar motors connected to the same supply can be used instead.

Heat exchanger units according to the invention can conveniently be grouped in towers as shown in FIGURES 4 and 5. In these figures eight similar units such as described with reference to FIGURES 1 and 2 are mounted with the downstream or free faces 20 of the blocks facing one another about the sides of a regular octagon each block having one end wall 10 downwards. At the bottom of the tower the blocks touch at the corners, but they slope outwardly and upwardly by a small angle so that at the top of the tower the blocks are spaced; the small triangular gap between adjacent blocks is filled e.g. by a sheet metal panel 21. Each rotor 5, 6 is driven by means of a separate electric motor, not shown, alternatively the rotors could be driven by means of pulleys mounted on each rotor and a single belt trained over all the pulleys and driven by a single electric motor. The drive by individual motors has the advantage that some of the rotors can be shut down if the demand for cooling is low.

The tower arrangement described provides for unobstructed access of air to the rotors 5, 6. The warm air within the tower rises as in a chimney so that putting the units together in this way does not involve additional resistance to flow.

What I claim is:

1. A cooling tower having side portions thereof formed of a plurality of upstanding rectangular shaped heat exchanger units extending the height of the tower with said units being outwardly and upwardly inclined; each said unit comprising an upstanding rectangular shaped heat exchanger block and a pair of upstanding outwardly and upwardly extending cylindrical rotors mounted with their axes parallel to each other on the outside of the block and extending over the height thereof for blowing air through the thickness of the block from the outside of the tower to the inside for upward discharge through the tower, and guide means which in operation of the rotors guides air twice through the blades of each rotor transversely to the axis thereof and subsequently through the block, said guide means including a pair of opposed diverging walls each leading from adjacent one rotor to the corresponding side of the block, said walls providing a common diffuser receiving the air from both rotors and leading it to the block; and drive means to rotate the rotors of each unit at equal speed in opposite directions.

2. A cooling tower as claimed in claim 1 wherein the heat exchanger blocks of adjacent units touch at their bottom edges.

3. A cooling tower as claimed in claim 1 wherein one wall diverges at an angle in excess of 60° with respect to the other wall.

References Cited by the Examiner

UNITED STATES PATENTS

| | | | |
|---|---|---|---|
| 1,825,036 | 9/1931 | Young | 164—124 X |
| 3,035,760 | 5/1962 | Simmons | 165—122 X |

FOREIGN PATENTS

| | | |
|---|---|---|
| 1,250,046 | 11/1960 | France. |
| 487,767 | 12/1953 | Italy. |

JAMES W. WESTHAVER, *Primary Examiner.*

CHARLES SUKALO, *Examiner.*